Patented May 3, 1949

2,469,340

UNITED STATES PATENT OFFICE 2,469,340

INSECTICIDAL USE OF FLUOROACETAMIDE

Nellie M. C. Payne, Stamford, Conn., assignor to American Cyanamid Company, New York, N. Y., a corporation of Maine No Drawing. Application May 24, 1944, Serial No. 537,185

1 Claim. (Cl. 167—22)

The present invention relates to the use of organic fluorine compounds which are innocuous to plants as insecticides.

The invention is specifically concerned with the use of those aliphatic fluorine compounds where the fluorine is attached to a carbon atom which is itself directly attached to a carbonyl group, the pH of the compounds being not less than 4.0. These compounds may be esters, amides, ketones or aldehydes, and will be found to be effective insecticides so long as the above specified fluorine relationship is maintained, so long as there is no other halogen attached to the alpha carbon atom, and will produce no plant injury so long as ones are used having a pH no less than 4.0.

These compounds will be found to have insecticidal toxicity not only when used as contact materials and as stomach poisons and synergists, but those materials capable of being readily vaporized will be found to be excellent fumigants.

By a pH not less than 4.0 is meant that pH measurement in water as a one-hundredth molar solution. It has been found if such compounds having a pH below 4.0 are used, a definite plant injury occurs. Perhaps fluoroacetic acid is most typical of those compounds which will burn or otherwise injure foliage and hence are not contemplated by the present invention. Fluoroacetic acid as a one-hundredth molar solution in water has a pH of 2.3. Tests have demonstrated that so long as the pH under the above conditions is greater than 4.0 such solutions are innocuous to plant life yet toxic to insects. This is a fortuitous circumstance as all compounds of the present group except the acid have a pH under the above conditions of 4.0 or above.

As showing the unexpected effect of such compounds using fluoroacetamide as an example and as compared with other compounds having either an acetamide group or other halogen or substituents attached to the acetamide group, tests were made on Aphis rumicis L. on nasturtiums in a water solution as a spray. As little as 6.8 parts per million of fluoroacetamide were found to give effective kills on these insects, while no plant injury occured.

On the contrary, where chlorine was substituted for the fluorine, 34 parts per million of chloroacetamide were required to give the same kill. Thiocyanoacetamide required 620 parts per million for the same toxicity.

It was thought that by introducing two chlorine atoms in addition to the fluorine in an acetamide molecule, the toxicity could be stepped up but upon actual tests on these insects, it required 14,000 parts per million of dichlorofluoroacetamide to give the same kill as 6.8 parts per million of fluoroacetamide.

The above results point clearly to the uniqueness of these compounds as insecticides.

A further series of experiments were conducted on Aphis rumicis L., also on nasturtiums, using a large number of related materials. In all cases, a water solution of the compounds was used containing the wetting agent commercially known as "Vatsol O. T." (dioctyl sodium sulfosuccinate) in the ratio of 1 to 5000, with the following results:

For instance, a .2% water solution of fluoroacetamide gave 100% kill, whereas the same concentration of acetamide killed only 11.2%; chloroacetamide killed 81%; thiocyanoacetamide killed 74.4%; dibromacetamide gave an 85.3% kill, while there was no kill whatever with cyanoacetamide or dichlorofluoroacetamide.

On further dilution, the other compounds which had shown some kill dropped off rapidly to zero while fluoroacetamide at even as low as .00312%, which is one part in thirty-two thousand, still gave a kill of 89%, and at a dilution of .00156%, which is one part in sixty-four thousand, still gave a kill of 75.8%.

Sodium fluoride is the standard stomach poison for Tribolium confusum (adults). When this material was fed to these insects in a 2% mix in flour it gave a 17.6% kill, while the same concentration of fluoroacetamide had a toxicity of 99.4%. When the sodium fluoride concentration was dropped to 1%, the kill was lowered to 5.7%. Even at this concentration, fluoroacetamide gave a 97.6% kill. Straight acetamide gave no kill whatever on these insects at either 1 or 2%.

In an attempt to determine whether the larvae of Tribolium confusum would succumb to fluoroacetamide, a spray was made of 1% fluoroacetamide in water. As a result of this test, it was found that 80.6% of the larvae sprayed died. This figure represents the actual kill, even when corrected for the normal death rate during the test period.

A water solution of fluoroacetamide in a dilution of 1 to 500 with a wetting agent ("Vatsol O. T.") in a ratio of 1 to 5000, was sprayed on cockroaches with nearly a 100% kill.

Bean leaves, on which southern army worm larvae (Xylonyges eridana Cramer) were feeding, were sprayed with a water solution of fluoroacetamide at a dilution of 1 to 200. A 100% control of the larvae was obtained with the fluoroacetamide solution whereas sodium fluoride at the same dilution produced no kill. No injury to the leaves or plants resulted.

The California red scale (*Aonidiella aurantii* Mask.) was sprayed with a water solution of fluoroacetamide containing the wetting agent, dioctyl sodium sulfosuccinate, in the ratio of 1 to 5000. A 92.3% control was obtained at a dilution of 1 to 400.

A water solution of fluoroacetamide at a dilution of 1 to 200 used as a spray on Mexican bean beetle adults (*Epilachna corrupta* Muls.) gave a 100% kill. Sodium fluoride at the same dilution gave only a 50% control.

A 0.1% water solution of fluoromethyl lauryl ketone containing the wetting agent, "Vatsol O. T.," in the ratio of 1 to 5000 was sprayed on black bean aphids growing on nasturtiums. No plant injury occurred and a 95.8% control of the aphids was obtained.

Using ethyl fluoroacetate as a fumigant in a dosage ratio of 10 milligrams per liter for 1 hour, 100% was obtained on *Tribolium confusum* (adults), *Sitophilus oryzae* (adults) and *Attagenus piceus* (larvae).

This is a most amazing fumigant effect, for at this dosage with these insects, ethyl fluoroacetate is more toxic than hydrocyanic acid, which has been considered the standard for a large number of years.

A water solution of lauryl fluoroacetate at a dilution of 1 to 2500 used as a spray on California red scale (*Aonidiella aurantii* Mask.) gave more than twice the kill obtained with lauryl chloroacetate at the same dilution.

A 90% control of black bean aphids feeeding on nasturtium plants was obtained with a 0.1% water solution of calcium fluoroacetate, without plant injury.

As showing the synergistic effect of the compounds of this invention with dioctyl fumarate, it was found that with a solution containing .025% of toxic material in water and consisting of 95% dioctyl fumarate and 5% of lauryl fluoroacetate, the combination was 3.7 times as effective against *Aphis rumicis* L. as was the same concentration of dioctyl fumarate alone.

The compounds of this invention may therefore be used either alone or with other insecticides or fumigants.

A number of experiments were performed to determine plant injury after having been sprayed with water solutions of compounds of the present invention. Even at concentrations of 1 to 500, no injury was apparent to sweet peas, tomatoes, beans (London horticultural) and nasturtiums. These plants are very sensitive to injury when sprayed with insecticides and consequently, a material non-injurious thereto, can be considered as completely innocuous to the usual variety of plants on which insects occur.

In view of the above, it is believed that the uniqueness of this class of compounds has been definitely demonstrated as synergists, fumigants, contact insecticides and stomach poisons.

While the invention has been described with particular reference to specific embodiments, it is to be understood that it is not to be limited thereto but is to be construed broadly and restricted solely by the scope of the appended claim.

I claim:

A method of combatting insects, which comprises contacting them with a toxic amount of fluoroacetamide.

NELLIE M. C. PAYNE.

REFERENCES CITED

The following references are of record in the file of this patent:

UNITED STATES PATENTS

| Number | Name | Date |
|---|---|---|
| 2,290,881 | Katzman | July 28, 1942 |
| 2,238,791 | Weedon | Jan. 11, 1944 |